Dec. 17, 1940.  A. ANDREWS  2,225,383
CENTRIFUGAL ENGINE GOVERNING MECHANISM
Filed Jan. 2, 1940
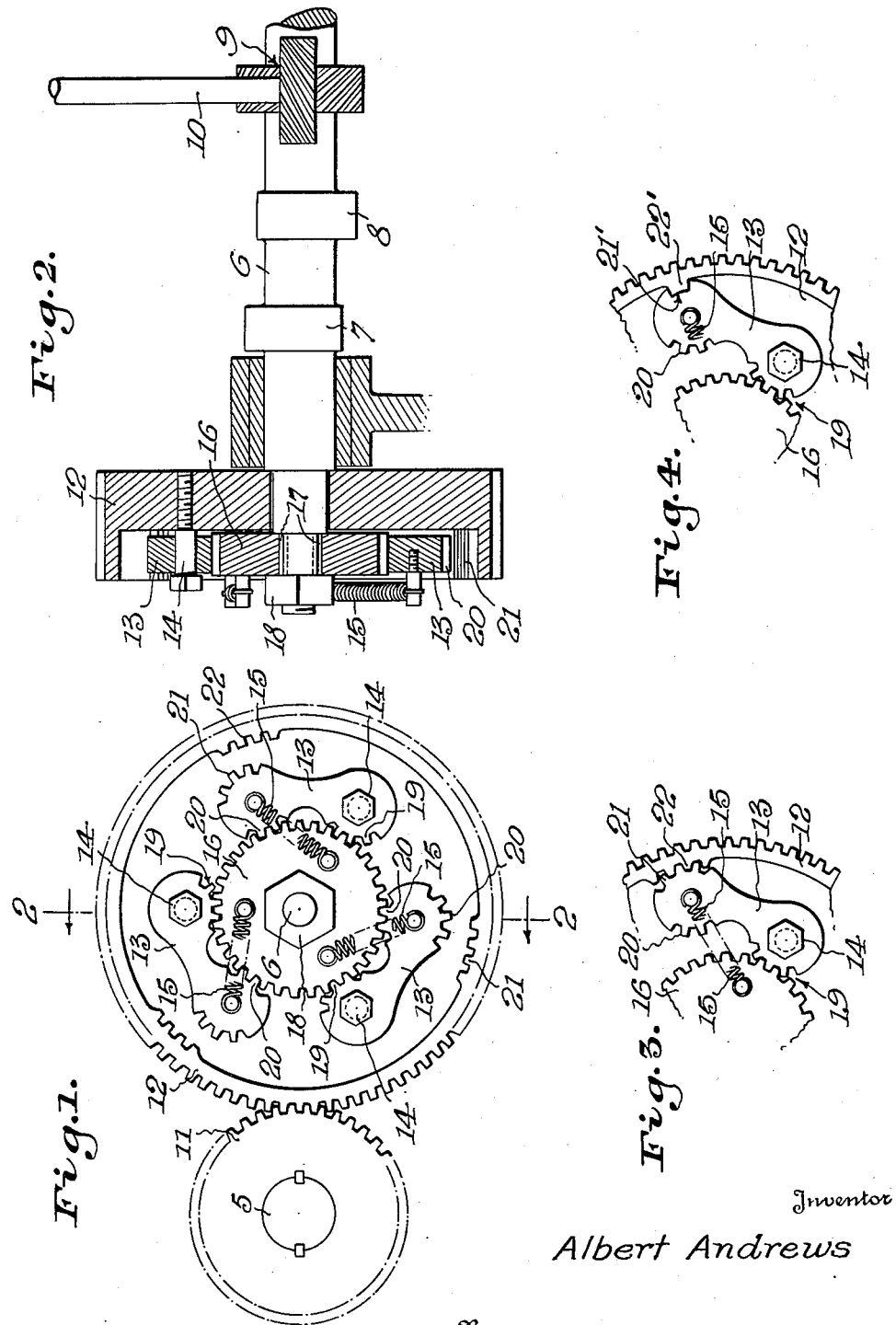
Inventor
Albert Andrews Patented Dec. 17, 1940

2,225,383

UNITED STATES PATENT OFFICE 2,225,383

CENTRIFUGAL ENGINE GOVERNING MECHANISM

Albert Andrews, Rapid City, S. Dak.

Application January 2, 1940, Serial No. 312,139

8 Claims. (Cl. 64—25)

The invention provides for the improvement of internal combustion engines, principally four-cycle engines, and provides more particularly for improving the valve-actuating means, my object being to provide a simple and effective governor mechanism for automatically advancing and retarding the usual valve-operating cam shaft in accordance with the engine speed, in such manner as to advance the opening and closing of the intake and exhaust valves for most efficient high-speed operation, and to retard the valve opening and closing to attain most efficient low-speed operation.

A further object of the invention is to provide an improved governor mechanism in which the pivots of the centrifugal weights, and other parts, are relieved of strain a great deal of the time.

With the foregoing in view, the invention resides in the novel subject matter hereinafter described and claimed, description being accomplished by reference to the accompanying drawing.

Figure 1 is a front elevation of the crank shaft, the cam shaft and the operating connections between the two, including the governor mechanism.

Figure 2 is a vertical sectional view on line 2—2 of Fig. 1.

Figure 3 is a detail view similar to a portion of Fig. 1 but showing one of the governor weights swung outwardly to the maximum.

Figure 4 is a detail elevation similar to a portion of Fig. 1 but showing a slight modification.

In the drawing above briefly described, 5 denotes the crank shaft of the engine and 6 refers to the cam shaft, two of the cams being indicated at 7 and 8. By means of the usual gearing 9, the cam shaft 6 drives the distributor shaft 10 and it will thus be seen that by advancing and retarding the cam shaft with respect to the crank shaft, the spark may be at the same time advanced and retarded without any special provision for this purpose.

The cam shaft 6 is driven at half the speed of the crank shaft 5 as usual, and while this may be done by sprockets and a chain, I have shown gears 11 and 12 for this purpose, gear 11 being fixedly secured to the crank shaft 5 while gear 12 is loose upon the cam shaft 6, said gear 12 being connected with said cam shaft, however, by a centrifugal governor mechanism which includes the weighted arms 13 pivotally mounted at 14. The weights 13 are connected with appropriate springs 15 which draw them inwardly, and said weights fly outwardly under centrifugal force, the arrangement of parts being such that outward movement of the weights advances the cam shaft 6 with respect to the crank shaft 5, and inward movement of said weights retards said cam shaft with respect to said crank shaft. The part 16 which is turned by the swingable weights 13, is fixedly secured to the cam shaft 6, two keys 17 and a nut 18 being shown for this purpose. This part 16 is preferably in the form of a small gear, and the operating connections between the weighted arms 13 and said part 16 preferably consists of intermeshed teeth 19. The arms 13 are provided at their free ends or at other suitable locations with teeth 20 which mesh with the teeth of the gear 16 when said arms occupy their innermost positions as shown in Fig. 1. The arms 13 are also preferably provided with teeth 21 to mesh with other teeth 22 carried by the gear 12 when said arms occupy their maximum outward positions. If desired, instead of using the teeth 21 and 22, equivalent interengageable notches and lugs may be provided as indicated at 21' and 22' in Fig. 4.

Until the engine attains a predetermined speed, the teeth 20 remain meshed with the teeth of the small gear 16, and thus the timing gear 12 is locked against any quivering or fluctuations with respect to the cam shaft, and moreover, the intermeshed teeth 19 are relieved of strain. Any increase in speed will cause the arms 13 to swing outwardly, whereupon the intermeshed teeth 19 will turn the gear 16 and the cam shaft 6 to advance the valve timing with regard to the crank shaft 5. When a predetermined engine speed is attained, the arms 13 occupy extreme outward positions in which the teeth 21 (or notches 21') engage the teeth 22 (or lugs 22') and it is thus again insured that there shall be no quivering or fluctuation of the timing gear 12 upon the cam shaft 6. Moreover, with the arms 13 thus connected at their outer ends with the timing gear 12, these arms act as direct drivers from said timing gear to the small gear 16 with little strain upon the gear-carried pivots 14.

From the foregoing taken in connection with the accompanying drawing, it will be seen that novel and advantageous provision has been made for carrying out the objects of the invention, and while preferred features have been illustrated, variations may of course be made within the scope of the invention as claimed. Furthermore, it will be obvious that the novel governor mechanism herein disclosed is not restricted to use on engines.

I claim:

1. In a device of the class described, a shaft to be driven, a member secured to said shaft, a wheel loose on said shaft, centrifugal arms pivotally mounted on said wheel, operating means establishing driving connections from said arms to said member and operative to turn the latter when said arms swing inwardly and outwardly, springs for swinging said arms to their innermost positions, and inter-engageable connecting means on said arms and wheel engageable when said arms occupy their outermost positions, said operating means and said inter-engageable connecting means being cooperable with said arms in establishing direct driving connections from said wheel to said member with little strain on the arm pivots when said arms occupy said outermost positions.

2. A structure as specified in claim 1; said inter-engageable connecting means consisting of teeth on said arms and wheel to intermesh when said arms occupy their outermost positions.

3. In a device of the class described, a shaft to be driven, a member secured to said shaft, a wheel loose on said shaft, centrifugal arms pivotally mounted on said wheel, operating connections from said arms to said member to turn the latter when said arms swing inwardly and outwardly, springs for inwardly swinging said arms to the maximum, and inter-engageable connecting means on said member and said arms independent of said operating connections and engageable when said arms occupy their innermost positions, to further connect said arms with said member and relieve the aforesaid operating connections of strain.

4. A structure as specified in claim 3; said inter-engageable connecting means consisting of teeth on said arms and member to intermesh when said arms occupy their innermost positions.

5. In a device of the class described, a shaft to be driven, a member secured to said shaft and having peripheral teeth, a wheel loose on said shaft, centrifugal arms pivotally mounted on said wheel and having teeth meshing with the teeth of said member, spring means for moving said arms inwardly, and interengageable means on said arms and wheel for engagement with each other when said arms swing outwardly to the maximum, whereby said interengageable means and said teeth are cooperable with said arms in establishing driving connections from said wheel to said member with little strain upon the arm pivots.

6. A structure as specified in claim 5; together with additional teeth on said arms to engage the teeth of said member when said arms occupy their innermost positions, to relieve strain from the first mentioned teeth of said arms and the teeth of said member which mesh therewith.

7. A structure as specified in claim 5; said inter-engageable means consisting of teeth on said arms and wheel to intermesh when said arms occupy their outermost positions.

8. In a device of the class described, a shaft to be driven, a member secured to said shaft and having peripheral teeth, a wheel loose on said shaft, centrifugal arms pivotally mounted on said wheel and having teeth meshing with some of the teeth of said member, spring means for moving said arms inwardly, inter-engageable teeth on said arms and wheel for engagement with each other when said arms swing outwardly to the maximum, whereby said wheel and member will be directly connected by means of said arms and teeth with little strain on the arm pivots when said arms occupy their outermost positions, and additional teeth on said arms to mesh with some of the teeth of said member to further connect said arms with said member and relieve the first mentioned intermeshed teeth thereof of strain when said arms occupy their innermost positions.

ALBERT ANDREWS.